Figure 1:
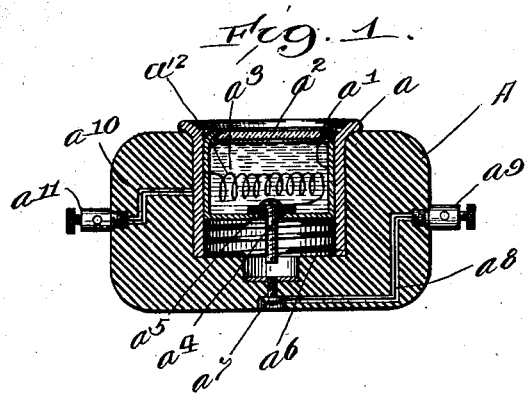

No. 720,550. PATENTED FEB. 17, 1903.
V. G. APPLE.
ELECTRIC CIRCUIT AND POLARITY INDICATOR.
APPLICATION FILED JUNE 17, 1901.

NO MODEL.

Witnesses:
Ray White
Harry R. Ewhite

Inventor:
Vincent G. Apple.
By Toree Bain Attorney.

UNITED STATES PATENT OFFICE.

VINCENT G. APPLE, OF DAYTON, OHIO.

ELECTRIC-CIRCUIT AND POLARITY INDICATOR.

SPECIFICATION forming part of Letters Patent No. 720,550, dated February 17, 1903.

Application filed June 17, 1901. Serial No. 64,803. (No model.)

*To all whom it may concern:*

Be it known that I, VINCENT G. APPLE, of Dayton, in the county of Montgomery and State of Ohio, have invented certain new and useful Improvements in Electric-Circuit and Polarity Indicators; and I hereby declare that the following is a full, clear, and exact description thereof, reference being had to the accompanying drawings, which form a part of this specification.

My invention relates to improvements in electric-circuit and polarity indicators.

The object of my invention is to provide a device which when used for closing an electric circuit will at the same time indicate that the said circuit has been closed.

A further object of the device is to indicate to the operator the polarity of the circuit with reference to the terminals of the device as it is placed in circuit.

One of the advantages of my invention is the fact that the operator is readily and certainly advised that the circuit which he is supposed to have closed has been truly closed and that the current has flowed through the circuit and performed its function as desired—as, for instance, when a guest in a hotel presses a push-button he has no means of knowing that the circuit has been closed by the operation of pressing the push-button; but when my new improvement is incorporated in the push-button there is a visible means of indicating to the guest that the circuit has been closed and his signal has therefore been announced.

Another use for which my invention is susceptible is to indicate to the person using it the direction in which the current is flowing through a given circuit. For portable use it is a ready and convenient means of indicating the positive and negative wires of a constant-potential circuit, which knowledge is necessary when it is desirable to connect an arc-lamp or a storage battery in the said circuit. It is a convenient means for ascertaining the respective polarities for this purpose.

In the drawings my invention is illustrated, in which—

Figure 2:
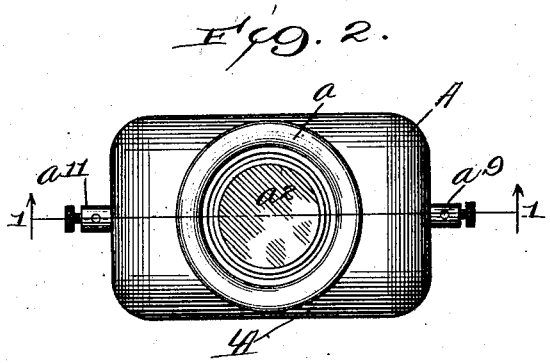

Figure 1 is a vertical central section taken on lines 1 1 of Fig. 2. Fig. 2 is a plan view of the same.

In the device illustrated, A indicates a block of insulating material. $a$ is a metal sleeve in the said insulating-block and flanged at the outward end. $a'$ is an inner case adapted to be reciprocated therein, having a closed bottom and open in the front or top, which opening is closed by a glass or other transparent plate $a^2$.

$a^3$ is a solution composed, preferably, of iodid or bromid of soda or potassium and a little free alkali or equivalent material.

$a^4$ is a screw fixed in the bottom of the inner case $a'$ and insulated therefrom by a bushing $a^5$. $a^6$ is an open helical spring for maintaining the said case in a raised position until depressed.

A small screw $a^7$ is placed in the bottom of the insulating-block and is connected by a wire $a^8$ to the binding-post $a^9$. This screw serves as one of the contact-points for the circuit-closing switch.

$a^{10}$ is a wire which connects the case $a$ to the binding-post $a^{11}$. The binding-posts $a^9$ and $a^{11}$ form the terminals of the device.

The case $a'$ is liquid-tight and contains a liquid that has the property of becoming discolored while a feeble current of electricity passes through it. In the device shown the circuit is not completed through the liquid $a^3$ until the contacts $a^4$ and $a^7$ have been brought into contact relation. This relation is established by a slight pressure upon the face $a^2$ of the reciprocating button $a'$, thereby compressing the open helical spring $a^6$ until the points $a^4$ and $a^7$ have been brought into electrical contact. As soon as the pressure is removed the spring $a^6$ will replace the case or button $a'$ in the position they occupy in Fig. 1 and break electrical contact between the points $a^4$ and $a^7$, thus opening the electric circuit. When the circuit is closed by the screw $a^4$ being brought into contact with the screw $a^7$, the current will flow from the screw $a^4$ through the liquid $a^3$ to the inner case $a'$ and from thence to the outer case $a$ through the wire $a^{10}$ to the terminal $a^{11}$. When the circuit is thus closed, the current in flowing through the liquid iodid or bromid will decompose the liquid and liberate iodin or bromin at the positive pole, and as soon as the current has ceased to flow through the liquid the free alkali will neutralize the iodin or bromin. When the bromin or iodin is liberated, it changes the liquid to a purple, red, or a blue color around the positive pole, and as soon as these materials are neutralized by the free alkaline the liquid is again rendered transparent. The iodin and bromin are always liberated at the positive pole, and by this means the positive pole may be identified. Suppose upon closing the circuit the liquid immediately surrounding the screw $a^4$ assumes a red or purple hue. Then we know that the current is flowing from terminal $a^9$ to and toward terminal $a^{11}$. If the liquid immediately in contact with the inner surface of the case $a'$ becomes temporarily discolored while the current is flowing, then we will know that the positive wire from the source of current is connected to terminal $a^{11}$ and that the direction of the current is from $a^{11}$ to $a^9$.

My push-button or circuit-closer may be used, among many other uses, in connection with voltmeters for determining the polarity of the circuit when connecting the voltmeters in circuit.

In all cases where it is necessary to pass a considerable current through the push-button a shunt $a^{12}$ to the liquid $a^3$, consisting of any suitable resisting medium, may be connected between the screw $a^4$ and the case $a$, and a portion of the current will flow through the shunt thus established and a very small, but sufficient, proportion through the liquid.

When the instrument is used for the purpose of indicating the polarity of an electric circuit of comparatively high voltage, the resistance of the liquid *per se* is so great as to prevent a very large current from flowing through it, and therefore it is perfectly safe to use it across the terminals of a comparatively high-voltage circuit.

Having described my invention, what I claim as new and useful, and desire to secure by Letters Patent of the United States, is—

1. A polarity-indicating electric-circuit closer comprising in a unitary device two relatively movable members, circuit-terminals associated with said members in electrical connection therewith, contact-points carried by the respective members and electrically connected with the circuit-terminals, and a decomposable, electrolytic element carried by one of the members and forming part of the connection between its contact-point and circuit-terminal.

2. A polarity-indicating electric-circuit closer comprising in a unitary structure a base member, a chambered member movable relative to said base member, electrical contacts carried by each of said members, circuit-terminals electrically connected with the respective contacts of said members, a decomposable, electrolytic element within the chamber of the movable member, forming part of the connection between the contact and terminal thereof, and a transparent closure for said chamber arranged to expose the contained element to view.

3. A polarity-indicating electric-circuit closer comprising a base A, a receptacle $a'$ containing an indicating decomposable material, indicating decomposable material $a^3$ within said receptacle, a transparent closure $a^2$ for said receptacle, two contact members $a^4$ and $a^7$ adapted to be closed, a spring $a^6$ for separating said members, and an electric circuit including said decomposable material and said contact members when said contact is closed.

4. A polarity-indicating electric-circuit closer comprising a base A, a receptacle $a'$ containing an indicating decomposable material $a^3$, a transparent closure $a^2$ for said receptacle, a resistance $a^{12}$ in electric shunt-circuit to said decomposable material, two contact members $a^4$ and $a^7$ adapted to be closed, a spring $a^6$ for normally separating said members, and an electric circuit including said resistance and decomposable material in parallel and said contact members in series therewith.

In testimony that I claim the foregoing as my own I affix my signature in presence of two witnesses.

VINCENT G. APPLE.

In presence of—
H. F. APPLE,
L. M. ARNOLD.